United States Patent [19]

Applegate

[11] 4,023,528
[45] May 17, 1977

[54] AERATING MEANS

[76] Inventor: Lyle C. Applegate, P.O. Box 637, Mentone, Calif. 92359

[22] Filed: Nov. 24, 1975

[21] Appl. No.: 634,926

[52] U.S. Cl. .................................. 119/5; 210/169; 261/123

[51] Int. Cl.[2] ...................................... A01K 63/00

[58] Field of Search .................................. 119/2–5; 210/169; 261/123, 122; 40/106.22, 106.21; 55/521

[56] References Cited

UNITED STATES PATENTS

| 608,397 | 8/1898 | Schwartz, Jr. | 261/123 |
|---|---|---|---|
| 3,101,564 | 8/1963 | Stoessel | 119/5 |
| 3,294,239 | 12/1966 | Dayes | 210/169 |
| 3,735,738 | 5/1973 | Lake | 119/5 |
| 3,778,976 | 12/1973 | Pond | 210/169 |

Primary Examiner—Louis G. Mancene
Assistant Examiner—Peter K. Skiff
Attorney, Agent, or Firm—John H. Crowe

[57] ABSTRACT

An aquarium having a tank with a flat, built-in aerator mounted at the rear. The aerator includes a housing having a number of narrow internal baffles arranged to form a zig-zag passageway for the upward flow of air into a space in the top of the housing. The bottom of the zig-zag passageway is disposed above a clear space in the lower part of the aerator housing, and each of the baffles runs from a first end at a first side edge to termination short of the opposite side edge of the housing. The baffles extend alternately from the opposite sides of the aerator housing, and each slopes slightly upwardly from its first end to its other end within the housing. The baffles are so arranged that each adjacent pair defines a transverse leg of the zig-zag passageway extending from one side of the aerator housing to the other and diverging vertically from a restricted entrance end to a far end where the entrance to the next higher leg of the passageway is situated. The aerator housing has openings into the clear space in its lower part to admit aquarium water and compressed air. The incoming air travels upwardly through the zig-zag passageway in turbulent contact with aquarium water in the passageway. The aerator has a top outlet for the aerated water through which it is returned to the main body of water in the tank.

10 Claims, 8 Drawing Figures

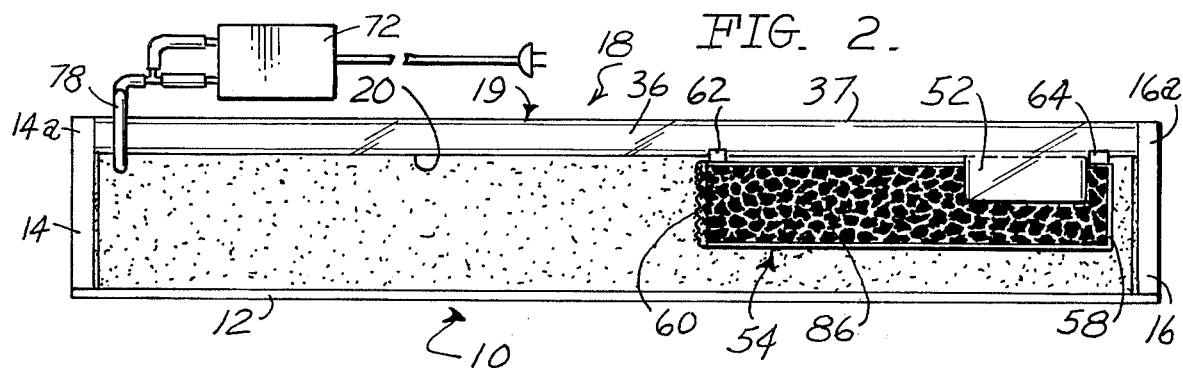
FIG. 2.
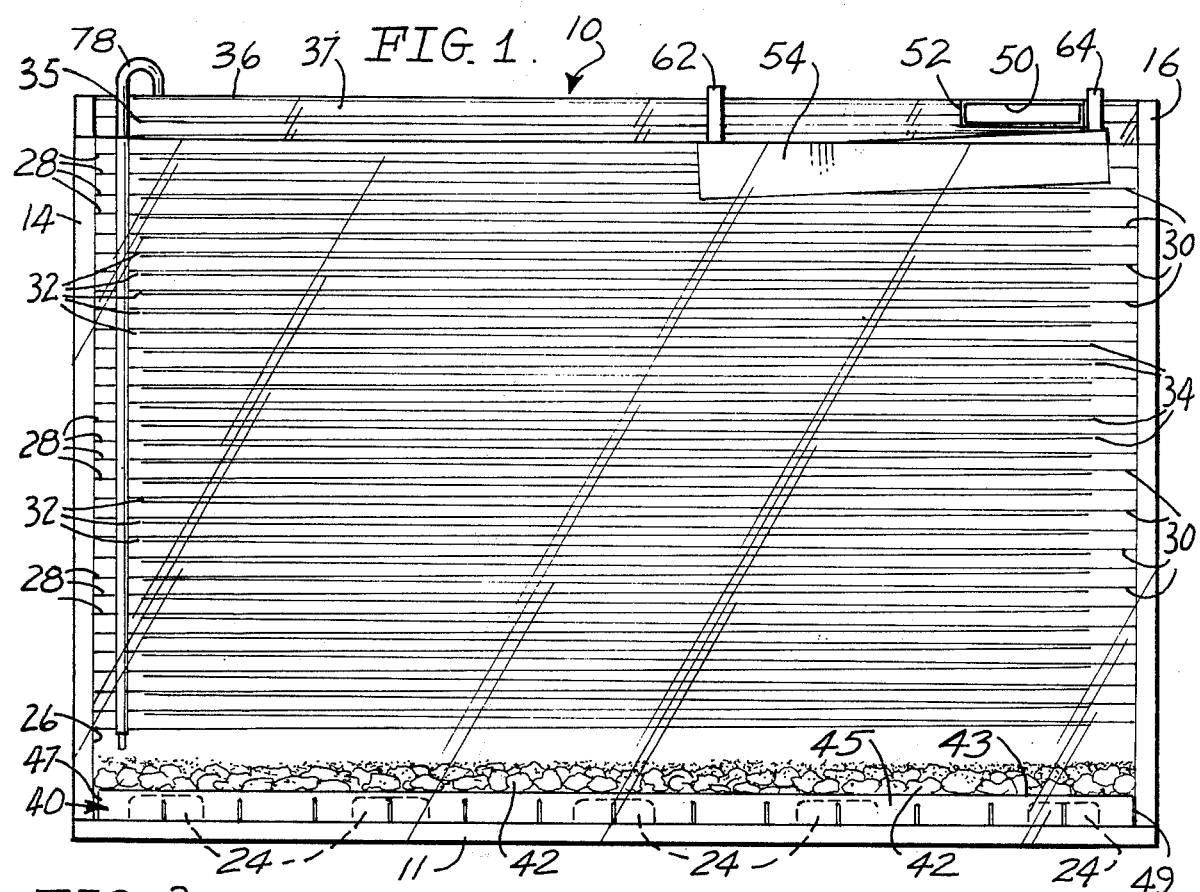
FIG. 1.
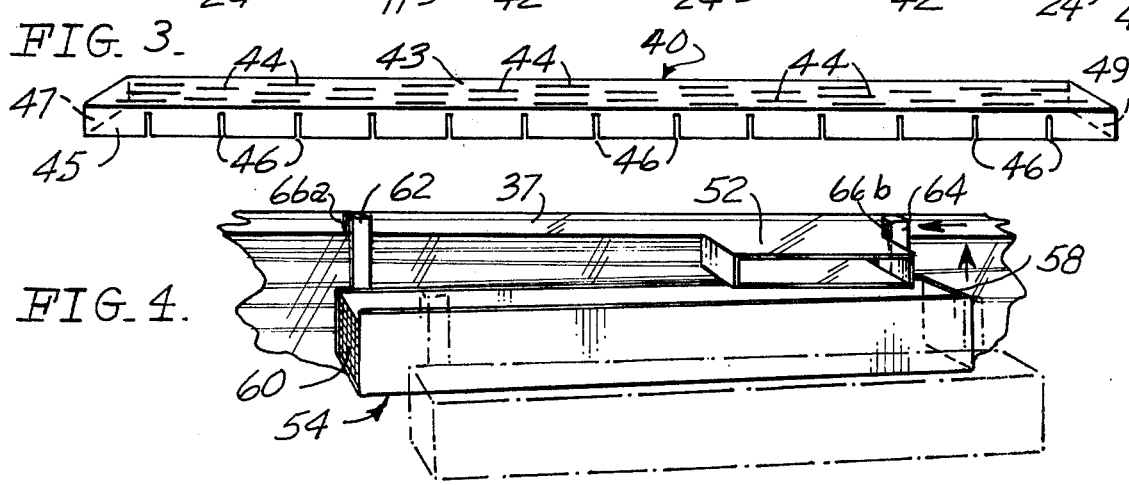
FIG. 3.
FIG. 4.

AERATING MEANS

BACKGROUND OF THE INVENTION

This invention relates generally to aquarium aerators, and more particularly to such aerators that are greatly superior to presently known aerators for maintaining the oxygen and carbon dioxide balances of small home aquariums at proper levels to support fish life.

It is of course well known to those familiar with standing water fish aquariums that the aquarium water must have an adequate quantity of dissolved oxygen to support fish life. It is also known that living fish give off carbon dioxide, and that the accumulation of an excessive amount of carbon dioxide in aquarium water can damage, or kill, fish exposed thereto. A common practice of aquarium owners, in this connection, is to introduce compressed air into aquarium waters for the addition of oxygen to, and the removal of carbon dioxide from, the waters, and there are many commercial "aerators" on the market for accomplishing these ends. All such aerators with which I am familiar are designed to release compressed air underwater in an aquarium, generally at the bottom of the aquarium tank, so that the air travels upwardly through the water to the surface, in the form of bubbles, aerating the body of water as it goes. The most common type of air release means used in these aerating systems, to my knowledge, comprises a porous stone through which the air permeates from an air inlet port to escape openings around the surface of the stone. When an aerator with such a stone is dispensing air to an aquarium it provides a vigorous display of fluid action but its aerating efficiency is actually quite low because the air released by the stone is in contact with the aquarium water for only a very short period of time, and the air bubbles, for the most part, are relatively large, which means that the combined area of air-water interface around the bubbles is relatively small. This, of course, makes for poor contact between the air and water and generally poor performance by the aerator. Obviously, any means that would make it possible to maintain feed air to an aquarium in contact with the aquarium water longer than the extremely short contact periods of air bubbles from conventional aerators and/or insure greater air-water interface area than these aerators permit would result in improved aerating effectiveness. No one has yet, to my knowledge, however, come up with any effective aerating means for substantially increasing the air-water contact time, air-water interface area, or both, over the contact times and interface areas obtained with presently conventional aerating equipment.

SUMMARY OF THE INVENTION

I have now, by this invention, provided unique aquarium aerating means capable of maintaining feed air in contact with aquarium water for prolonged periods of time under conditions of turbulent admixture therewith, and constantly shifting areas of interface between the air and water, to thereby achieve highly effective aeration of the aquarium water at relatively low air feed rates.

In a preferred form, the aquarium aerator of this invention comprises a flattened enclosure or housing having a clear space in the bottom above which are arranged a plurality of elongate baffles in vertically ascending order. These baffles extend from opposite side walls of the housing, alternating from one side to the other and each sloping upwardly at a slight angle, to define a zig-zag passageway from the clear space to a point near the top of the housing. Each baffle is sealed to the housing walls at its lower end and along both side edges, but terminates, at its upper end, short of the side wall of the housing toward which it slopes upwardly to leave a gap between said upper end and said side wall. Also, the upper end of each baffle terminates close to the bottom surface of the baffle directly thereabove to form (with the latter) a restriction in the zig-zag passageway. From this restriction, the adjacent baffles diverge toward the opposite side wall of the housing, where there is another restriction between the free end of the upper baffle and the bottom surface of the next higher baffle. This arrangement results in the formation of a tortuous passageway with spaced restrictions alternating from one side to the other within the aerator housing, the spaced restrictions being separated by stretches of passageway of vertically diverging character.

There is an opening into the clear space at the bottom of the housing for an air intake line, and an outlet opening near the top of the housing. The aerator is designed for upright use in an aquarium having a water level below said outlet opening in said housing. For such use, it is positioned so that the baffles extend vertically upwardly from the clear space in the aerator housing to the outlet opening, which opening is preferably situated at the upper surface of the lower end of the topmost baffle.

In its preferred form, the aerator includes an open-topped trough for holding a quantity of filtering material such as activated charcoal, which trough is enclosed at one end and fitted with a screen at the opposite end. The trough has cooperating means for holding it in an inclined position in an aquarium with its enclosed end at a higher level than its screened end, and adjacent the outlet opening in the top of the aerator housing, and the screened end above the water level of the aquarium. This trough serves as filtering means for aerated aquarium water, as will be explained in greater detail below. The aerator housing can be either built into an aquarium, or manufactured as a separate unit that can be placed in an existing aquarium tank. The front wall of the housing, in its preferred form, has openings at the bottom into the clear space in its lower part to permit the entry of aquarium water into that space and the zig-zag passageway thereabove. Accessory means for preventing the entry of gravel and other foreign matter in the bottom of the aquarium into these openings can be provided if desired.

When the aerator housing is positioned for use in a filled aquarium and receiving no feed air, the aquarium water will seek substantially the same level in the aerator housing as in the aquarium tank. To prepare the aerator for use, the housing is fitted with a trough of the above-described type in which a suitable filtering material is placed and an air line from a suitable air pump is connected to the air inlet opening in the bottom of said housing. When the air pump is turned on, compressed air is forced into the clear space in the bottom of the aerator housing and, after a time, this air starts to make its way upwardly through the zig-zag passageway in the housing. The movement of air through the passageway is turbulent and characterized by intermittent bursts of speed as it enters the restrictions separating the legs of the zig-zag passageway, followed by velocity slowdowns as it passes through the diverging legs. As the air progresses through the zig-zag passageway, the nature of its travel is such that it causes turbulent agitation of the water in the passageway and forces this water gradually upward to the upper side of the top baffle (in the preferred form of my novel aerating means). When the water reaches that point, it flows down the slope of the top baffle to the lower end of the latter and out of the outlet opening in the top of the housing. From there the water enters the filter trough and passes through the filtering material therein, then out of the screened end of the trough and back into the main body of water in the aquarium. Since there is communication between the main body of aquarium water and the space within the aerator housing, there is a continual flow of water through the aerator so long as compressed air is fed into the bottom of the housing.

The angle of inclination of each of the baffles of the aerator is relatively slight, from which it will be evident that a large number of baffles will be required in the case of an aerator intended for use in the average aquarium. Consequently, the total travel distance in the zig-zag passageway formed by the baffles is great, perhaps 60 or 70 times the width of the aerator housing, with the result that the air is in contact with the aquarium water for a substantial length of time as it travels upwardly through said housing. This, coupled with the turbulent character of the air and water flow through the aerator housing (which results in large areas of constantly changing interface between the air and water), makes for prolonged, intimate contact between the rising air and aquarium water to yield aerating results far superior to those obtainable with any presently available aerator of which I am aware.

Because of its extraordinarily effective aerating ability, the novel aerator of this invention is excellently suited for use in aquariums of limited holding capacity. Thus, an aquarium with a built-in version of my aerator, or fitted with the aerator in some other way, can be of relatively flat configuration for wall display purposes because the limited volume of water in such an aquarium can be easily serviced by the aerator to maintain the water in good condition to sustain fish life for long periods of time. Such a flattened aquarium can, if desired, be fitted with a frame, to enhance its decorative appearance. Also, if at least the front wall of the aerator housing is made of a transparent material, the turbulent movement of the air through its zig-zag passageway can be observed as a visually fascinating display of fluid movement. My novel aerator does not require a complexity of parts and air can be simply and easily fed thereto by means of a conventional air pump at no greater expense than would be required for the operation of an ordinary aerator of the porous stone type.

It is thus a principal object of the present invention to provide an aquarium aerator greatly superior in aerating effectiveness to any conventional aerator heretofore known.

It is another object of the invention to provide such an aerator of simple and economical construction that can be operated at no greater expense than is required for the operation of any commercially available aerator of presently known type.

Yet another object of the invention is to provide aerating means for maintaining the water in a flat aquarium of limited capacity in good condition to support an over-abundance of fish life for show or wall display purposes.

Still another object of the invention is to provide such aerating means serving, additionally, to create an eye-catching display of fluid movement to add visual appear to aquarium tanks.

Other objects, features, and advantages of the invention will become apparent in the light of subsequent disclosures herein.

BRIEF DESCRIPTION OF THE DRAWINGS

FIG. 1 is a front elevation of an aquarium provided with a built-in aerator of preferred form in accordance with this invention, the aquarium being shown empty of water to avoid confusing and unnecessary detail.

FIG. 2 is a top view of the aquarium and built-in aerator, the aerator being shown connected to an electrically-powered air pump for supplying air thereto, the conductor cord for the pump being shown with a portion broken away.

FIG. 3 is a perspective view of a perforated plate for supporting gravel or the like at a predetermined level above the bottom of the aquarium tank for a purpose hereinafter revealed.

FIG. 4 is an enlarged fragmentary view of a portion of the aerator structure with removable filtering means attached and showing, additionally, in phantom lines, the filtering means removed from its position of attachment to said structure.

FIG. 6 is an enlarged view of the rear of the lower left corner of the FIG. 1 aquarium, as it appears after the aquarium has been filled with water and said air pump has been turned on.

DESCRIPTION OF THE PREFERRED EMBODIMENT

Figure 5:
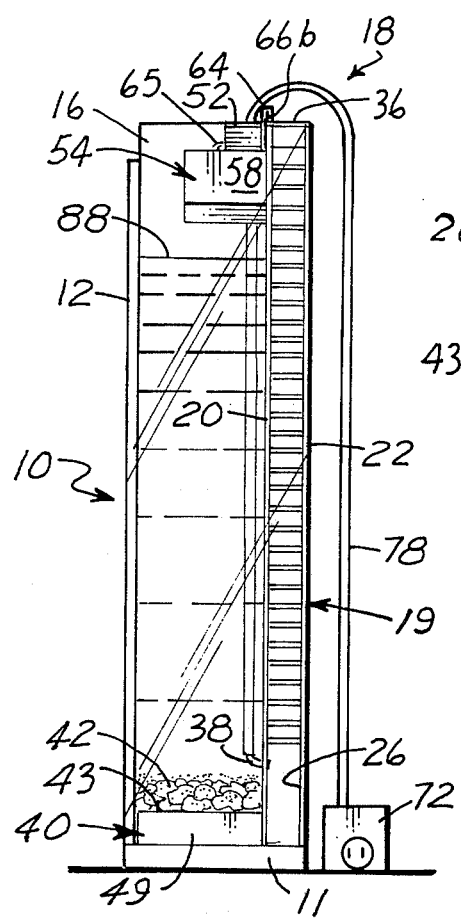
FIG. 5 is an end view of the aquarium and built-in aerator as seen from the right of its FIG. 1 position, the aquarium here being shown filled with water.

Considering now the drawings in greater detail, there is shown generally at 10 a flat display aquarium having a built-in aerator 18 of preferred design in accordance with this invention. The aquarium is in the shape of a flattened tank, having a front wall 12, a left wall 14 and a right wall 16. The built-in aerator 18 comprises a thin housing 19 positioned at the rear of the aquarium tank and serving to provide a rear wall, or closure, therefor. The front wall 12 of the aquarium tank is preferably of clear plastic construction although it can be formed from any material suitable for the purpose, such as, for example, glass. The left and right side walls of the aquarium tank, as well as the component parts of aerator housing 19, are also preferably of clear plastic construction, although here again they could be made from any material suitable for the purpose. Aquarium 10 has a bottom 11 which is formed from a suitable plastic or other material. The parts of the aquarium tank can be fitted together and sealed against water leakage by techniques known to those skilled in the art. These parts should, of course, be made from materials substantially resistant to corrosion in the presence of aquarium water and having no toxic or polluting effect on such water, examples of such materials including polyvinyl chloride (PVC) plastic, plexiglass, glass, and other materials well known to those skilled in the art.

The aerator housing 19 has a relatively thin front wall 20, a rear wall 22 of approximately the same thickness as the front wall, and a top closure 36. The front and rear walls 20 and 22 of the aerator housing 19 are positioned in parallel planes to enclose a relatively flat space therebetween. These walls (20, 22) are fastened around their side and bottom edges, except for openings in the bottom of wall 20 soon to be described, to the walls and bottom of the aquarium. Those portions of the left and right walls 14 and 16 of the aquarium tank falling between the front and rear walls of the aerator housing thus form the side walls of that housing, said portions being shown at 14a and 16a in the FIG. 2 view.

Figure 6:
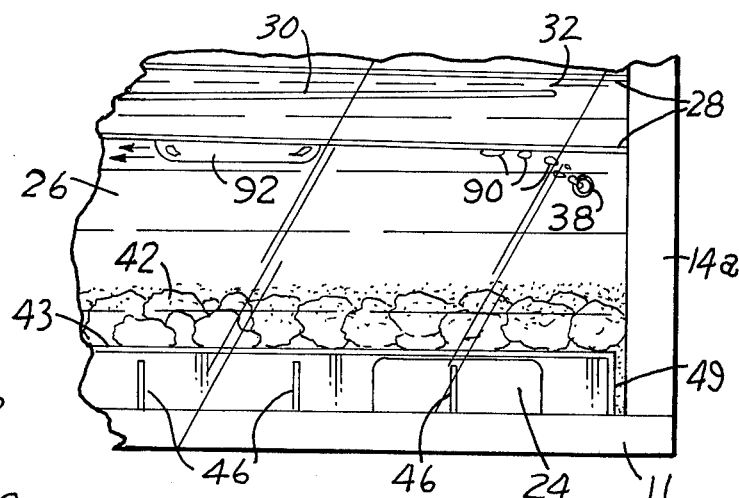

For a relatively short distance up from the bottom of aquarium 10, the space within aerator housing 19 is clear, that space being indicated by the reference numeral 26 in FIGS. 1, 5 and 6 of the drawings. Partially enclosing this space, at the top, is the lowermost of a plurality of flat, elongate baffles 28, which baffle runs from the left wall 14a of aerator housing 19 to a point of termination short of the opposite sidewall 16a of the housing. The baffles 28 are of equal length and all slope sightly upwardly to the right, at equal angles of inclination, and are sealed around their edges to the aerator housing walls, except, of course, for their right ends, which are spaced equidistantly inwardly from the right sidewall of the housing, all as seen in FIG. 1. Running from the right wall of the aerator housing are a plurality of baffles 30 similar in character to baffles 28. Baffles 30 slope upwardly at the same shallow angle of inclination as baffles 28, but their direction of slope is upwardly to the left, as seen in FIG. 1, rather than upwardly to the right, as in the case of baffles 28. Except for the top and bottom baffles, each of baffles 28 is disposed between two of the baffles 30, and vice versa. The baffles 30 are sealed around their sides and lower edges to the aerator housing walls, and their upper ends terminate short of the left sidewall of the housing the same distance that the upper ends of baffles 28 terminate short of the right sidewalls of said housing. The number of baffles 30 is equal to that of baffles 28, and the former are the same distance apart as the latter.

The lower (sealed) end of each of baffles 30 (except for the topmost one) is disposed at a level halfway between the two lower ends of the two nearest baffles 28. Likewise, all but the lowermost baffle 28 has lower ends disposed at a level halfway between the levels of the lower ends of the two nearest baffles 30. As FIGS. 1 and 7 make clear, the relative sizes and geometric relationships of the baffles 28 and 30 are such that together they define a zig-zag passageway extending upwardly through the aerator housing from the clear space 26 in the bottom of the housing to the top portion of said housing, which passageway has a plurality of regularly spaced restrictions alternating between the right and left sides of the housing interior, as seen in FIG. 1. These restrictions occur at the upper ends of the baffles, where each closely approaches the baffle directly thereabove, as can be seen at 32 on the left, and 34 on the right, in FIG. 1.

The highest baffle in aerator housing 19 is a baffle 30, whose highest end (to the left in FIG. 1) closely approaches an overhead, shortened baffle 37 parallel to the baffles 28 (similarly to the way the other baffles 30 approach baffles 28 to form restrictions 32) to form a restriction 35. From each restriction 32 or 34, the zig-zag passageway diverges vertically to a vertical dimension equal to the space between a pair of adjacent baffles 30 or 28 (which space is, as previously indicated, the same in each set of baffles), at which point the next higher restriction 34 or 32 occurs, beyond which the direction of extension of the passageway is reversed.

There is an opening 50 in the upper right-hand corner of the front wall 20 of aerator housing 19, as seen in FIG. 1. This opening is situated near the lower end of the upper surface of the top baffle 30 to provide an outlet from the housing for water flowing down that surface during operation of the aerator in the below-described manner.

The shortened baffle 37 terminates at its higher end at the left side of the opening 50, as seen in FIG. 1. This is not a critical feature of the aerator, however, and baffle 37 could be extended to the same length as the length of baffles 28, if desired. Furthermore, it is even within the scope of my invention to continue the baffles of the zig-zag passageway upwardly through the space vented by opening 50, if desired, although there would appear to be no particular advantage in doing this.

A short distance below the bottom one of the baffles 28 there is an opening in the front wall 20 of aerator housing 19 in which is mounted an L-shaped fitting 38 adapted to receive one end of an air hose 78 (see FIGS. 1 and 5) the other end of which is connected to an electrically powered air pump 72 for supplying compressed air to the aerator. The air pump 72 can be any commercially available pump of a type suitable for use in supplying air to aquariums, one example of such a pump being distributed by Metaframe of Mountain View, Calif., under the trademark Hush II (further identified as Cat. No. 82). The Hush II pump operates on current from a standard 115-volt AC source, and delivers a minimum air output of 200 cubic inches per minute at 4 psi.

Positioned at the bottom of aquarium 10, so as to substantially occupy its whole cross-sectional tank area, is a removable filtrant support member 40. The member 40 has a level top 43, a downturned front flange 45 and downturned end flanges 47 and 49, respectively. It is preferably formed from metallic or plastic material of a type that resists corrosion in aquarium water and is otherwise suitable for the purpose (stainless steel being a typical example of a satisfactory metal for the purpose). Along the lower edge of the front wall 20 of aerator housing 19 are a plurality of equally sized openings 24. These openings are provided for the purpose of admitting water from the tank area of the aquarium into the aerator housing, and, as FIG. 1 shows, they are low and wide, extending upwardly from the bottom of the aquarium less than the distance of the air fitting 38 thereabove. Many, if not most, aquariums are provided with a filtrant, such as gravel or the like, and the purpose of the filtrant support member 40 is to support a bed of such material at a level above the tops of the openings 24 to keep it from clogging the openings, such a bed so supported being shown at 42 in FIGS. 1 and 5. To permit the free circulation of water through the filtrant bed and into the openings 24, the top 43 of filtrant support member 40 has a plurality of slots 44 therein, and the front flange 45 of the member is provided with further slots 46. Slots 46 are not critically necessary, however, and could be dispensed with if desired.

Detachably mounted adjacent the front side of the upper right-hand corner of aerator housing 18 (as seen in FIG. 1) is a filter trough 54. Hereinafter, the filter trough will be described in terms of reference to its FIG. 1 position. The right end of filter trough 54 has an enclosure 58, but its left-hand end is fitted with a screen 60. The purpose of the filter trough is to hold a quantity of activated charcoal, such as shown at 86 in FIG. 2, in position to permit the circulation of water therethrough on its way to the main tank area of the aquarium from outlet opening 50 of aerator 18 when the aerator is functioning as described below. So that it may serve this purpose, the filter trough is supported at a slight angle from the horizontal in the tank area of the aquarium, with its upper end positioned under opening 50 and its left end above the water level in said aquarium. The filter trough 54 is provided with a pair of integral hangers 62 and 64 of unequal length, by means of which it is suspended in the inclined position just described. The hangers have hooked upper ends which fit over a pair of upstanding holding tabs 66a and 66b on the top of aerator housing 19 in the manner best illustrated in FIGS. 4 and 5.

Similarly to filtrant support member 40, filter trough 54 should preferably be formed from metallic or plastic material of a type that resists corrosion when exposed to aquarium water and is otherwise suitable for the purpose (an example of a satisfactory metal, as previously indicated, being stainless steel). The same thing is true, of course, with respect to the screen 60.

Water flowing from the aerator housing is directed into filter trough 54 by means of a spout 52 integral with the front wall of said housing in such position as to receive the water after it passes through opening 50 in said front wall. The spout 52 extends about halfway across the width of filter trough 54, so as to easily discharge the outflowing water from aerator housing 19 into the trough (see FIG. 5, where water flowing from the spout can be seen at 65).

Before aerator 18 is activated, the water surface in the main part of aquarium 10 should preferably be at about the level shown at 88 in FIG. 5 (and the water in aerator housing 19 should also be at approximately that level). Then, when the air pump 72, properly connected to a suitable source of power, is turned on, a large pocket of air accumulates in the clear space 26 at the bottom of the aerator housing. After a relatively short period of time, the air starts working its way through the lowermost of the right-hand restrictions 34 of the zig-zag passageway of FIG. 1. It will be noted that the lowermost one of the baffles forming the zig-zag pasageway is one of the baffles 28 sloping upwardly to the right, as seen in FIG. 1, and that the entry of air into the aerator housing is at the left-hand side of clear space 26, under the baffles, again as seen in FIG. 1. In the following discussion of the progress of the air through the zig-zag passageway, all references to orientation of parts and direction of air and water movement will be in terms of reference to the position of the aquarium as seen in FIG. 1.

Once the air from the accumulated pocket of air in clear space 26 starts working its way through the zig-zag passageway in aerator housing 19, it proceeds, in small bubbles and pockets, first in one direction and then in the other, through the consecutive legs of the passageway. Eventually, the air reaches the uppermost restriction 35 in the passageway, from whence it travels to the right and out through the opening 50 in the top right-hand corner of the aerator housing. As the air travels upwardly through the zig-zag passageway, it carries a certain amount of the water in the passageway with it, and forces this water through the uppermost restriction 35 of the passageway in pulsating surges, which water thereafter flows along the downwardly inclined upper surface of the uppermost baffle (30) until it reaches the outlet opening 50 in the front housing wall, from whence it flows through the spout 52 and filter trough 54, then back into the main body of water in the aquarium. This recirculated water is in a high state of purity for re-use, having been aerated and purged of toxic gases during its passage through aerator 18 and subsequent contact with the activated charcoal in the filter trough.

A relatively short time after the air starts making its way through the zig-zag passageway in aerator 18, all of the air in the air pocket in clear space 26 has passed into the zig-zag passageway, and fresh feed air to the aerator finds its way into the zig-zag passageway in the form of relatively small bubbles or pockets. As the air is discharged into the aquarium water from the air inlet fitting 38, it forms separate bubbles, such as shown at 90 in FIG. 6. These bubbles rise in the water until they come into contact with the lowermost baffle 28 forming the bottom of said zig-zag passageway, and then, for the most part, I believe, coalesce into large bubbles or air pockets such as shown at 92 in FIG. 6. These large bubbles, wanting to rise in the water, move to the right along the lower surface of the lowermost baffle 28, since the baffle slopes upwardly to the right to make such movement possible. The directional arrows in FIG. 6 indicate this direction of movement of the large bubble 92.

Figure 7:
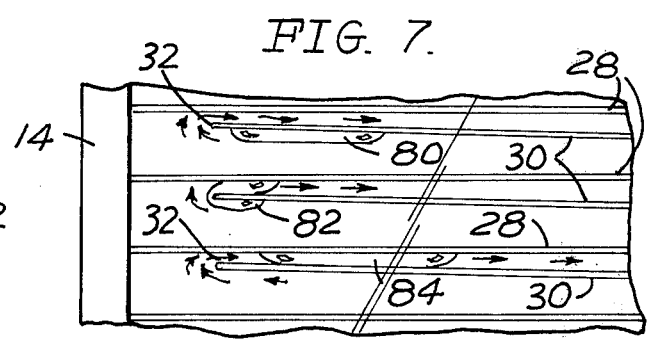
FIG. 7 is an enlarged view of a fragmentary part of the aquarium, showing a portion of a zig-zag passageway for air in the aerator and bubbles of air working their way through water in the passageway.
Figure 8:
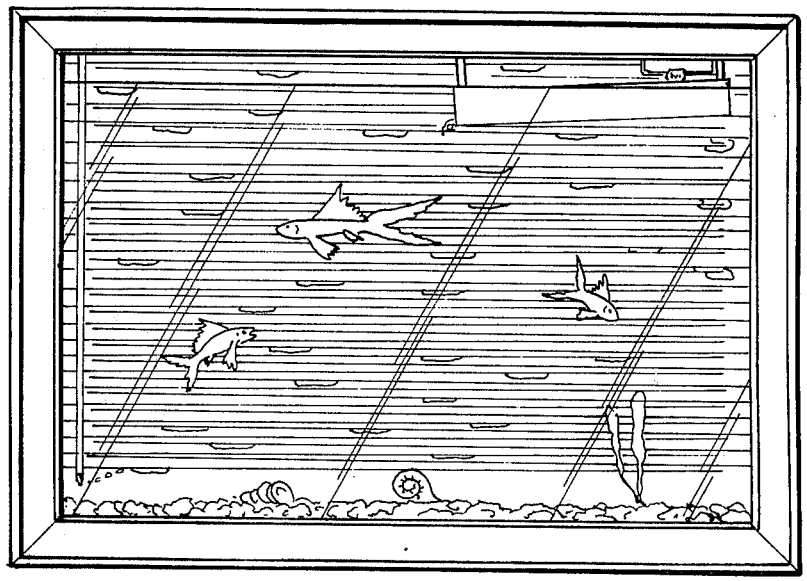
FIG. 8 is a front elevation of the FIG. 1 aquarium mounted in a frame for wall display purposes.

When the pockets or bubbles of air reach the restricted entrance opening into the zig-zag passageway (the lowermost restriction 34), they do not, insofar as I have been able to observe, immediately pass through that entrance, but instead, pause and, after a short time, burst through the entrance at relatively high velocity. Once they have cleared the entrance, the air bubbles pass from right to left through the first leg of the zig-zag passageway at a much slower rate than that at which they entered the passageway until they reach the first restriction 32 at the left side of the passageway, where they again pause, and, after a short time, burst through that restriction at accelerated velocity. From here, the bubbles then move to the right until they reach the second restriction 34, where they pause and then repeat their rapid movement through that restriction. This manner of progress is continued, with the bubbles bursting through alternate restrictions at the sides of the zig-zag passageway, and then traversing higher and higher legs of the passageway, until they reach the restriction 35 at the top of said passageway, and are thereafter vented to the atmosphere through the outlet opening 50 at the top of the aerator housing. FIG. 7 illustrates the way in which the bubbles of air turn the corner, so to speak, at the restictions in the zig-zag passageway, a bubble approaching such a restriction being shown at 80, another bubble part way through another restriction being shown at 82, and a third bubble 84 being shown as it appears after having burst through one of the restrictions. It should be noted that the design of aerator housing 18 is such that each of the baffles forming the top enclosure of each leg of the zig-zag passageway slopes upwardly toward the entrance to the next higher leg. This is important because it permits the air bubbles passing through the zig-zag passageway to move through the legs with facility. This would not be possible, of course, if the top baffle of each leg of the passageway sloped downwardly in the direction of travel therethrough.

While I have attempted to describe the manner in which feed air travels through the zig-zag passageway of aerator 18 in terms of reference to air bubbles such as those illustrated at 80, 82 and 92 in the drawings, I wish to make it clear that such bubbles do not remain intact all the way through the passageway. To the contrary, as the air travels through the maze of the passageway, it causes a considerable amount of turbulence in the water therein, forming and reforming various bubble patterns and creating large areas of changing air/water interface during its long and tortuous passage through the aerator. Because of this turbulent flow pattern, and the great distance of travel of the air through the zig-zag passageway of the aerator (about 65 times the width of the aerator housing, as will be clear from FIG. 1), the aquarium water is exposed to the air for a prolonged period of time, and over wide areas of constantly changing interface, during its travels through said zig-zag passageway. This results in far greater aerating effectiveness than is possible with a conventional porous stone aerator, even though, I have determined, the rate of air feed is no greater for the aerator of this invention than for the porous stone aerator.

As will be clear from FIG. 5, the air passing upwardly through the zig-zag passageway of aerator 18 must lift the water therein substantially higher than the level 88 of the main body of water in the aquarium in order to discharge it through the outlet opening 50 in the aerator housing. I do not profess to have a scientific explanation of this "air-lift" action, but have ascertained experimentally that an aerator designed and constructed like that illustrated in the drawings functions in the manner described herein. It is, of course, true that air bubbles in a body of liquid cause displacement of the liquid in such a way as to raise the surface level of the body, and this no doubt is largely responsible for the higher level of water in the aerator housing than in the main body of the aquarium when aerator 18 is in operation. There is, however, communication between the main tank area of the aquarium and the aerator housing, so other reasons must be advanced, it seems to me, to fully explain the difference between the water level inside and that outside said housing. Perhaps surface tension in the restricted areas of the zig-zag passageway figures in the explanation. Or the fact that the lower baffle of each leg of the passageway slopes downwardly to prevent at least some of the water from ever flowing out of that leg might be a factor in the explanation. In any event, even though I cannot fully explain what makes the novel aerator of this invention function, I have found that it is extraordinarily effective in accomplishing aerating results different in kind from any results heretofore thought possible, at least insofar as I am aware. To test the effectiveness of the aerator in this regard, I installed such an aerator in an aquarium tank, added water to the tank and placed about 40 goldfish in the water. The size of the tank was such that it was far overcrowded with the 40 goldfish. I then covered the surface of the water with mineral oil and operated the aerator for 30 days with the surface thus sealed off from the atmosphere. The fish thrived during this experimental test, although they would have died in far less than 30 days had a conventional aerator been employed in lieu of my novel aerator.

I have experimentally determined that the laterally alternating pattern of restrictions in the zig-zag passageway described herein is critically necessary to proper functioning of my novel aerator. It is difficult to put absolute dimensions on these restrictions, but the dimensions must be such that the restrictions have a venturi effect on the air bubbles to cause those bubbles to increase in velocity as they pass through the restricted openings. I know this to be true because I have tested zig-zag passageways without such restrictions, and found such passageways unsatisfactory for the purpose. The angles of the baffles cooperating to form the zig-zag passageway of the aerator should be shallow, approximately the same as the FIG. 1 baffle angles.

While the aquariums and aerators of this invention can vary in external and internal structural particulars within the scope of the invention, I have found the following sizes and dimensions to be particularly satisfactory for use in the design of an aquarium with a built-in aerator of the type generally illustrated in the drawings:

| | |
|---|---|
| Aquarium depth | 18 inches |
| Aquarium thickness | 4 inches (approximately) |
| Aquarium width | 29 inches (approximately) |
| Width of zig-zag passageway | 7/8 inch (approximately) |
| Distance from free end of each baffle to nearest side wall of aquarium | 1 inch (approximately) |
| Vertical clearance at each zig-zag restriction | 3/32 inch (approximately) |
| Vertical distance from each baffle to free end of next baffle there above | 1/2 inch (approximately) |

Where it is desired to display tropical, or other ornamental, fish to best advantage, such as in pet shops or at meets where the fish are judged, so-called show tanks are employed. Show tanks are relatively thin in order to keep the fish "up front" for good viewing. Even so, however, these tanks are generally 8 or 10 inches thick, since if they are thinner than this, there is difficulty in keeping the limited volume of water therein in good enough condition to support fish life for any length of time. As a matter of fact, fish cannot even be left in a show tank of 8- or 10-inch thickness for very long because of the difficulty of keeping the water in the tank properly aerated with presently available aerating equipment. Where the aerator of the present invention is employed, however, the show tank thickness can be reduced to 4 or 5 inches, and fish maintained in the tank for prolonged periods of time, because of the high efficiency and effectiveness of the aerator. A 4- or 5-inch tank, of course, shows the fish to much better advantage than one twice that thick. An ideal tank for the support of fish life is one having a lot of open area at the top to permit good air-water contact, but this doesn't make a good viewing tank. By contrast, I have found that through the use of my novel aerator, a 4- or 5-inch thick aquarium, with its good show qualities, can be made to support fish life as well as, or better than, an "ideal" tank with a large water surface area, and thereby provide the perfect aquatic environment for those wishing to display fish to best advantage for one reason or another.

The thin aquariums made possible through use of the novel aerating means of this invention can be mounted in frames and hung on walls like pictures for decorative effect. The fluid movement in the zig-zag passageway of the aerator can easily be seen in the background of such a thin aquarium to enhance its visual impact when mounted in a frame. This fluid movement adds a dynamic new visual dimension to the aquarium that makes it especially effective for use as a show tank, whether framed or not.

I consider the heart of this invention to reside in my novel aerator housing and zig-zag passageway, and such accessory items as the filter trough adjacent the outlet opening in the top of the housing and the filtrant support member in the bottom of the aquarium, while highly desirable, are not considered critically necessary to at least marginal operation of my aerating means. While the aerating means has been herein described and illustrated in what is believed to be a preferred embodiment, it will be understood by those skilled in the art that various departures can be made therefrom within the scope of the invention. Certain of these departures have already been described, and others will occur to those skilled in the art in the light of present teachings.

As an example of the latter, the lowermost baffle in the aerator housing could slope upwardly to the left, rather than to the right as in aerator 18, in which case the air inlet opening position would preferably be in the right-hand part of the front wall of the aerator housing, as opposed to its left-hand position in the front wall of housing 19. The water outlet opening at the top of the aerator housing (opening 50 in housing 19) can, of course, be positioned near either the right or left side of the housing, depending upon the direction of slope of the water drainage baffle corresponding to the topmost baffle 30 in aerator 18.

In summary, the intended scope of the present invention is such as to include all variant forms thereof encompassed by the language of the following claims.

What I claim is:

1. Aerating means for an aquarium, comprising:
a relatively thin housing having closely spaced front and rear walls and two narrow side walls; and
internal structure in the housing comprising a plurality of elongate baffles forming a zig-zag passageway above a clear space in the bottom of said housing, each baffle being integral along side edges thereof with said front and rear walls to form a web-like extension therebetween and having a first end integral with one of said side walls and a second end terminating short of the other of said side walls, the joints between the baffle and housing walls being fluid-tight;
said baffles being arranged so as to extend in interlaced relationship from first one and then the other of the side walls of said housing means, each being positioned so as to incline slightly upwardly from said first end to said second end and all but the uppermost one forming, with the next higher baffle, a single leg of said zig-zag passageway, said leg having a restricted entrance at said second end and gradually thereafter expanding as the baffles defining its upper and lower limits diverge because of their opposite directions of inclination,
said housing having at least one opening through at least one wall into the clear space in its bottom for the admission of aquarium water and having, additionally, a port for the introduction of compressed air into said clear space, said housing also having an outlet opening above an upper one of said baffles, near the lower end of that baffle;
said internal structure including means cooperative with said upper one of said baffles, which means can be one of the baffles, to define, with the housing walls, a space above said upper one of said baffles, said space having a restricted entrance between said means and the upper end of said upper one of said baffles;
said aerating means being adapted for use with its housing immersed in the water of an aquarium in such fashion that said outlet opening is above the level of said water, and with a compressed air line attached so as to direct compressed air through said port into said clear space;
whereby the forcing of said compressed air into said clear space, after the aquarium water has filled said housing to substantially the level of the water outside of the housing, results in turbulent upward movement of the air through the water in the zig-zag passageway to thereby provide intimate contact between the air and aquarium water in the zig-zag passageway for efficient aeration of said water; and
whereby the water in the zig-zag passageway is forced upwardly therethrough by the air until it enters said space through the restricted entrance thereto, then runs down the inclined upper surface of said upper one of said baffles and out of said housing through said outlet opening, from whence it can be returned to the main body of water in the aquarium.

2. Aerating means in accordance with claim 1 in which the front wall of said housing is formed of a transparent material so that the intermixing of air and water in the housing during operation of said aerating means can be seen through said wall, and each of said baffles inclines upwardly at substantially the same angle of inclination.

3. Aerating means in accordance with claim 2 in which said at least one opening through at least one wall is through the front wall of said housing, and said port is located at a level above said at least one opening.

4. Aerating means in accordance with claim 3 in which said at least one opening consists of a plurality of openings.

5. Aerating means in accordance with claim 4 in which the port in said housing is located in the front wall of the housing near the first end of the lowermost of said baffles.

6. A flattened aquarium with built-in aerating means in accordance with claim 3, said aerating means being positioned in the back of the aquarium so that the rear wall of said housing forms the rear wall of said aquarium.

7. An aquarium in accordance with claim 6 in combination with filtrant support means adapted to support a bed of filtrant above the level of said at least one opening to leave the at least one opening clear for the free circulation of aquarium water therethrough.

8. An aquarium in accordance with claim 7 including a filter trough for holding a quantity of activated charcoal and means for supporting the trough with a load of charcoal in such position as to receive aerated water from the outlet opening of said housing and direct the flow of said water through said charcoal and into the body of aquarium water outside of said housing.

9. An aquarium in accordance with claim 8 including spout means for channeling the flow of said aerated water from said outlet opening to said filter trough.

10. An aquarium in accordance with claim 6 in combination with a decorative frame, said frame being fitted peripherally around the aquarium to permit display of the latter against a wall.

* * * * *